(12) United States Patent
Terashima (10) Patent No.: US 9,229,113 B2
(45) Date of Patent: Jan. 5, 2016

(54) RECEIVING DEVICE AND CORRELATION INTEGRATING METHOD

(71) Applicant: Seiko Epson Corporation, Tokyo (JP)

(72) Inventor: Maho Terashima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 13/927,047

(22) Filed: Jun. 25, 2013

(65) Prior Publication Data

US 2013/0343436 A1    Dec. 26, 2013

(30) Foreign Application Priority Data

Jun. 26, 2012   (JP) .................................. 2012-143024

(51) Int. Cl.
  *G01S 19/24* (2010.01)
  *H04L 7/00* (2006.01)
  *G01S 19/30* (2010.01)

(52) U.S. Cl.
  CPC ................ *G01S 19/24* (2013.01); *G01S 19/30* (2013.01); *H04L 7/0029* (2013.01); *G01S 19/246* (2013.01)

(58) Field of Classification Search
  CPC ..................................................... H04L 7/0029
  USPC ......................................................... 375/150
  See application file for complete search history.

(56) References Cited

U.S. PATENT DOCUMENTS

| 5,325,427 | A  | * | 6/1994 | Dighe ........................... 379/386 |
| 6,028,887 | A  | * | 2/2000 | Harrison et al. ............... 375/147 |
| 6,407,699 | B1 | * | 6/2002 | Yang ......................... 342/357.59 |
| 7,486,749 | B2 |   | 2/2009 | Pietila et al. |
| 2006/0083163 | A1 | * | 4/2006 | Rosen ........................... 370/229 |
| 2006/0133463 | A1 |   | 6/2006 | Pietila et al. |

* cited by examiner

*Primary Examiner* — Michael Neff
(74) *Attorney, Agent, or Firm* — Kilpatrick Townsend & Stockton LLP (57) ABSTRACT

In a baseband processing circuit unit, a sample memory stores a received data sequence obtained by sampling a signal received by an RF receiving circuit unit at a given sampling time interval. A data sequence estimating unit estimates an estimated data sequence, which is obtained when the received signal is sampled at a sampling time shifted by a given shift time from the sampling time of the received data sequence, on the basis of the received data sequence stored in the sample memory. A correlation operation unit performs a correlation operation on the estimated data sequence estimated by the data sequence estimating unit 22 and a replica code. An integration unit integrates the correlation operation result from the correlation operation unit at a given integration time interval.

5 Claims, 5 Drawing Sheets

RECEIVING DEVICE AND CORRELATION INTEGRATING METHOD

This application claims priority to Japanese Patent Application No. 2012-143024, filed Jun. 26, 2012, the entirety of which is hereby incorporated by reference.

BACKGROUND

1. Technical Field

The present invention relates to a receiving device that receives a satellite signal from a positioning satellite, and the like.

2. Related Art

A global positioning system (GPS) is widely known as a positioning system using a satellite signal and is used for a receiving device built in a mobile phone, a car navigation apparatus, and the like. In the GPS, a position calculating operation of calculating the position coordinate and the clock error of a receiving device is performed on the basis of positions of plural GPS satellites, pseudo-distances from plural GPS satellites to the receiving device, and the like.

In environments in which a received GPS satellite signal has a weak electric field state (weak electric field environments), a received signal is weak, a correlation value obtained through a correlation operation is small, and it may be thus difficult to detect a peak of the correlation value. Therefore, particularly in weak electric field environments, a technique of integrating correlation values, which have been obtained by performing a correlation operation, over a predetermined period of time is used (for example, see US-A-2006-0133463).

When a GPS satellite signal is actually received (when capturing a signal), a receiving frequency includes an error due to a Doppler frequency. That is, a Doppler shift occurs depending on a variation in relative positional relationship between a GPS satellite and a receiving device and the receiving frequency is shifted from 1.57542 [GHz] which is a carrier frequency of a GPS satellite signal.

The Doppler shift has a great influence on a correlation integrating process of integrating correlation values. This will be specifically described. A correlation value for each phase is obtained through a correlation operation on a received signal and a replica code. A code phase is specified on the basis of a phase (hereinafter, referred to as a "peak phase") corresponding to the maximum correlation value and a pseudo-distance is calculated on the basis of the specified code phase and is used for positioning.

However, the peak phase is shifted with the lapse of time due to the influence of the Doppler shift. Therefore, when a correlation value for each phase obtained through the correlation operation at a certain time and a correlation value for each phase obtained at a subsequent time are sequentially and repeatedly integrated for each corresponding phase, the peak phase varies and is superposed and thus the shape of the correlation value (hereinafter, referred to as an "integrated correlation value") integrated for each phase is blunted as a whole, thereby making it difficult to distinguish the peak phase. Therefore, a technique of integrating the correlation values with a phase shift when integrating the calculated correlation values for each phase is generally used in the related art. This correlation integrating process is the same in positioning systems other than the GPS.

SUMMARY

An advantage of some aspects of the invention is that it provides a new technique of a correlation integrating process different from the techniques according to the related art.

A first aspect of the invention is directed to a receiving device including: a receiving unit that receives a satellite signal from a positioning satellite; a storage unit that stores a received data sequence obtained by sampling the signal received by the receiving unit at a given sampling time interval; an estimation unit that estimates an estimated data sequence, which is obtained when the received signal is sampled at a sampling time shifted by a given shift time from the sampling time of the received data sequence, based on the received data sequence; a correlation operation unit that performs a correlation operation on the estimated data sequence and a replica code; and an integration unit that integrates the correlation operation result in the correlation operation unit at a given integration time interval.

As another aspect of the invention, the invention may be configured as a correlation integrating method including: acquiring a received data sequence by sampling a signal received from a positioning satellite at a given sampling time interval; estimating an estimated data sequence, which is obtained when the received signal is sampled at a sampling time shifted by a given shift time from a sampling time of the received data sequence, based on the received data sequence; performing a correlation operation on the estimated data sequence and a replica code; and integrating the correlation operation result at a given integration time interval.

According to the first aspect and the like, a received data sequence is acquired by sampling the received signal received from a positioning satellite at a given sampling time interval. An estimated data sequence, which is obtained when the received signal is sampled at a sampling time shifted by a given shift time from the sampling time of the received data sequence is estimated on the basis of the received data sequence. Accordingly, an effect as if the received signal were shifted in phase can be obtained. A correlation operation is performed on the estimated data sequence estimated in this way and the replica code, and the correlation operation result is integrated at a given integration time interval. According to this configuration, it is possible to prevent the shift of a peak phase due to a Doppler shift at the time of performing a correlation integrating operation.

As a second aspect of the invention, the receiving device according to the first aspect of the invention may be configured such that the estimation unit estimates the estimated data sequence by performing a predetermined interpolating operation based on sampled values constituting the received data sequence.

According to the second aspect, it is possible to estimate the estimated data sequence by performing a predetermined interpolating operation based on the sampled values constituting the received data sequence.

As a third aspect of the invention, the receiving device according to the first or second aspect of the invention may be configured such that the estimation unit estimates the estimated data sequence using a time corresponding to a shift amount, by which a peak phase is shifted due to a Doppler shift during the integration time interval, as the shift time.

According to the third aspect, the estimation unit estimates the estimated data sequence using a time corresponding to the shift amount, by which the peak phase is shifted due to the Doppler shift, as the shift time during the integration time interval, whereby it is possible to compensate for the shift of the peak phase due to the influence of the Doppler shift.

As a fourth aspect of the invention, the receiving device according to the first or second aspect of the invention may be configured such that the receiving device further includes a shift amount calculating unit that calculates a shift amount, by which a peak phase is shifted due to a Doppler shift, during the integration time interval, wherein when the shift amount is equal to or more than a given phase search interval, the estimation unit estimates the estimated data sequence using a time corresponding to a difference between the phase search interval and the shift amount as the shift time and the correlation operation unit performs the correlation operation on the replica code, the phase of which is shifted by the phase search interval, and the estimated data sequence.

According to the fourth aspect, the shift amount calculating unit calculates the shift amount by which the peak phase is shifted due to the Doppler shift during the integration time interval. When the calculated shift amount is equal to or more than a given phase search interval, the estimation unit estimates the estimated data sequence using the time corresponding to the difference between the search interval and the shift amount as the shift time, and the correlation operation unit performs a correlation operation on the replica code, the phase of which is shifted by the search interval, and the estimated data sequence. That is, the shift of the peak phase by the search interval is compensated for by shifting the phase of the replica code by the search interval, and the shift of the peak phase more than the search interval is compensated for by estimating the estimated data sequence using the time corresponding to the difference between the search interval and the shift amount as the shift time.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Principle of Correlation Integrating Process in Exemplary Embodiment

In this exemplary embodiment, a correlation operation is continuously performed on a signal received from a GPS satellite, which is a kind of positioning satellite, and a replica code and the correlation operation result is integrated. As described above, an error due to a Doppler frequency is included in a receiving frequency when a GPS receiver actually receives a GPS satellite signal. The code cycle (estimated code cycle), which is obtained by causing the receiver to estimate one cycle of a C/A code which should be originally a repetition cycle of 1 ms, is shifted from the true code cycle due to the presence of the Doppler frequency.

Since the code cycle is shifted due to the influence of the Doppler shift, the code phase varies. As a result, when a correlation operation is performed on the received signal and the replica code, the peak phase is shifted by the shift amount due to the Doppler shift. This phenomenon is also referred to as "code Doppler".

Figure 1:
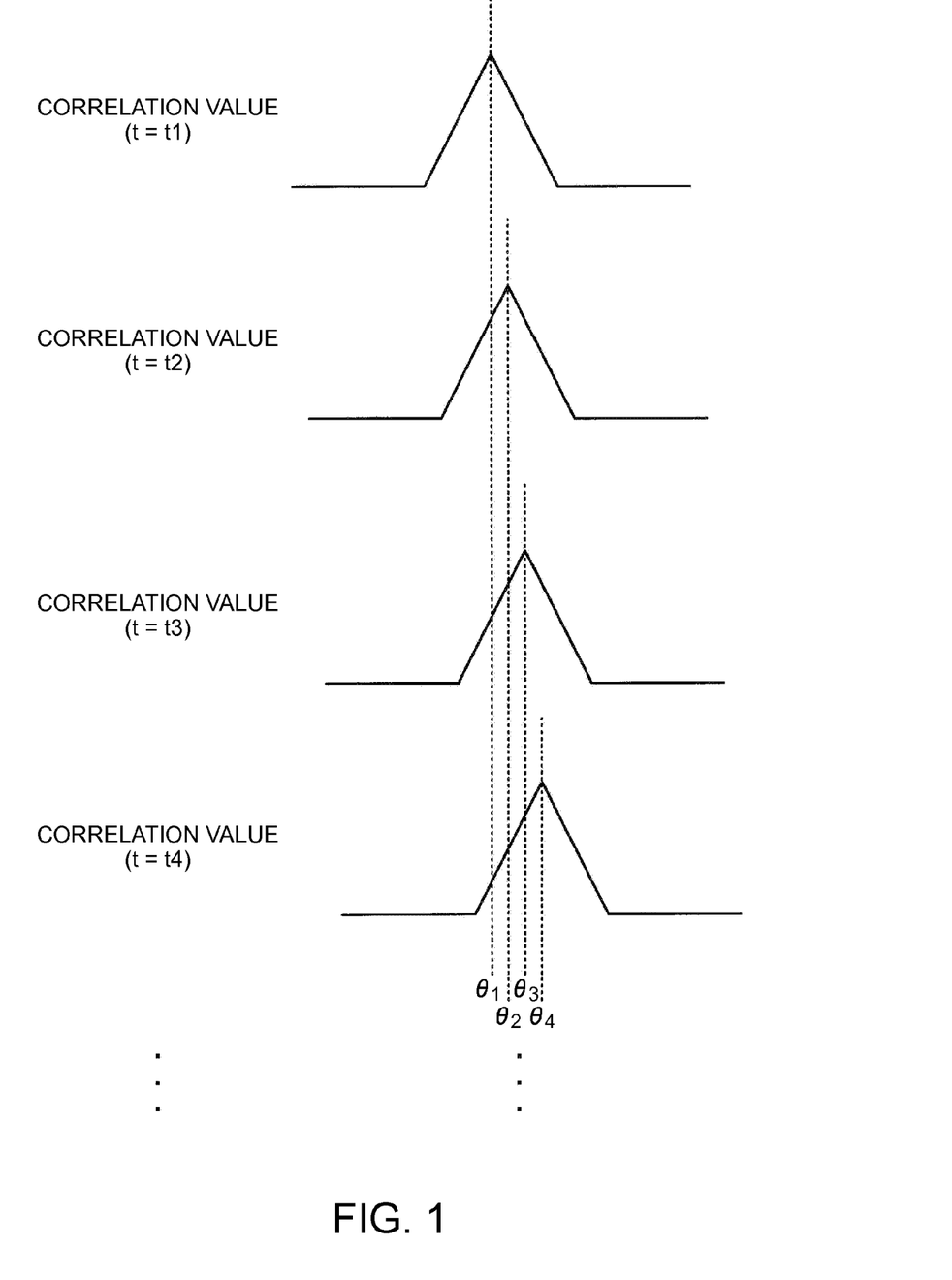
FIG. 1 is a diagram illustrating a principle.

FIG. 1 is a diagram illustrating the shift of the peak phase. FIG. 1 shows a schematic diagram illustrating a correlation value when performing a correlation operation on the received signal and the replica code at times every predetermined integration time interval. Specifically, correlation values obtained by performing the correlation operation at times "t=t1, t2, t3, t4, ... " as the times every predetermined integration time interval are schematically illustrated. In the schematic diagram of correlation values at the times, the horizontal axis represents the phase and the vertical axis represents the correlation value.

At time "t=t1", the peak phase is "θ1". However, the peak phase varies with the lapse of time due to the phenomenon of code Doppler. That is, the peak phase varies to "θ2" at time "t=t2", varies to "θ3" at time "t=t3", and varies to "θ4" at time "t=t4". The same is established at the subsequent times. In this case, when the correlation values which are the correlation operation result are integrated at the integration time interval, an integrated correlation value having a blunted shape as a whole is obtained as the integration result. As a result, a problem in that it is difficult to distinguish the peak phase occurs. Therefore, in this exemplary embodiment, the correlation integrating process is performed in the following order.

Since the received signal received from a GPS satellite is an analog signal, a received data sequence which is digital data is obtained by sampling the received signal at a predetermined sampling time interval. This is a so-called A/D (Analog/Digital) conversion. The sampling time interval can be appropriately set, and for example, a time interval of 1/n (where n is an integer of 2 or greater) of the chip cycle of the C/A code can be set. For example, when "n=2" is set, the received signal is sampled at a time interval of 1/2 chip.

Subsequently, an estimated data sequence, which is obtained when the received signal is sampled at times shifted by a given shift time from the sampling times of the received data sequence, is estimated on the basis of the received data sequence. In this case, the estimated data sequence is estimated using a time corresponding to a shift amount, by which the peak phase is shifted due to the Doppler shift during the predetermined integration time interval, as the shift time. The integration time interval may be set to a fixed time interval or may be set to be variable. For example, when the integration time interval is defined as 10 ms, the estimated data sequence is estimated using the time corresponding to the shift amount, by which the peak phase is shifted due to the Doppler shift during 10 ms, as the shift time.

The shift amount of the peak phase is determined depending on the Doppler shift and the Doppler shift is acquired from the relative positional relationship (more specifically, the relationship in relative movement) between the GPS satellite and the GPS receiver. Therefore, by acquiring the integration time interval, the orbit of the GPS satellite, and a certain level of position of the receiving device (normally, the initial position in calculating the position), the shift amount of the peak phase can be determined.

A case where the shift amount is converted into the chips of the C/A code will be described below. The shift amount of the peak phase (hereinafter, referred to as "peak phase shift amount") "ΔCP" is calculated by Expression 1 using a shift amount of a frequency (hereinafter, referred to as "frequency shift amount") from a prescribed carrier frequency "Δf" and an integration time interval "Δt".

$$\Delta CP = \Delta f / 1540 \times \Delta t \quad (1)$$

Here, "1540" is a value obtained by dividing the prescribed frequency (1.57542 [GHz]=1575.42 [MHz]) by a chip rate (1.023 [MHz]) of the C/A code. More accurately, the frequency shift amount Δf can be divided into two components of a Doppler frequency and a clock drift of the GPS receiver.

However, the Doppler frequency is dominant. Accordingly, in this exemplary embodiment, the Doppler frequency is used as the frequency shift amount Δf.

Figure 2:
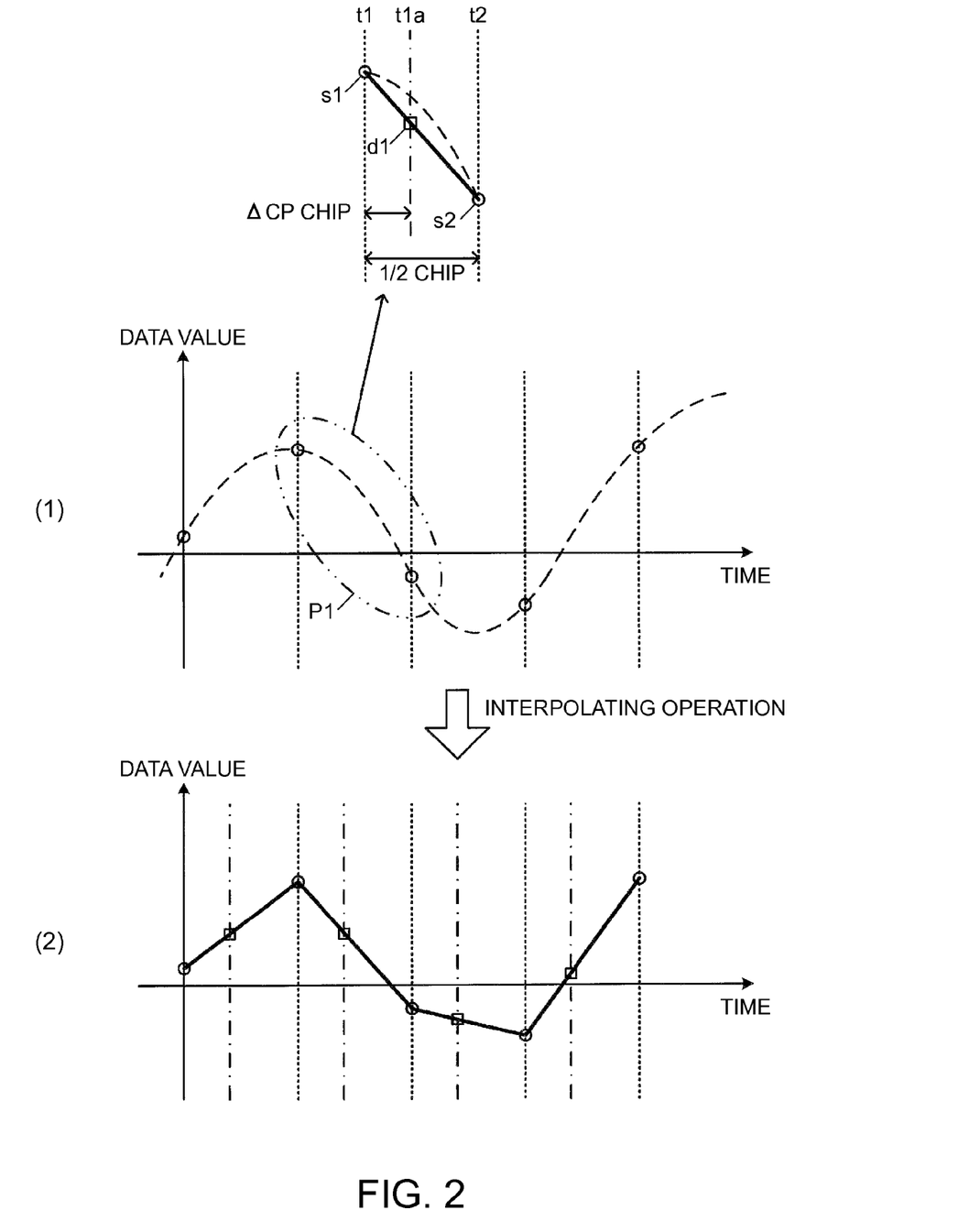
FIG. 2 is a diagram illustrating a principle.

FIG. 2 is a diagram illustrating the principle of estimating an estimated data sequence. In (1) of FIG. 2, an example of a temporal variation of the received signal is indicated by a dotted line. The horizontal axis represents the time and the vertical axis represents the data value. The sampled values of the received signal indicated by the dotted line are drawn to overlap with the waveform of the received signal in a plot of white circles. The dotted line parallel to the vertical axis represents the sampling times and the time interval of the sampling times is shown to be 1/2 chip.

A predetermined interpolation operation based on the sampled values of the received data sequence is performed to estimate the estimated data sequence. Here, an example where a linear interpolating operation which is a relative simple method is performed as the interpolating operation to estimate the estimated data sequence will be described.

Description will be made with attention to part p1 surrounded by a two-dot chained line in (1) of FIG. 2.

A time t1a which is shifted from the sampling time t1 by a shift time corresponding to the ΔCP chip which is the peak phase shift amount is considered (the one-dot chained line in the drawing) and a data value of the received signal at the time t1a is estimated through the linear interpolation. Specifically, by linearly interpolating the sampled value s1 at the sampling time t1 and the sampled value s2 at the neighboring sampling time t2 on the basis of the relationship between the sampling time interval and the ΔCP chip time, the data value at the time t1a is calculated and is set as an estimated data value d1 (the rectangular plot in the drawing).

The linear interpolation of calculating the estimated data values in the above-mentioned order is performed on all the neighboring sampling times. As a result, as shown in (2) of FIG. 2, an estimated data sequence including the estimated data values at the times shifted by the time corresponding to the peak phase shift amount from the sampling times is obtained. The estimated data sequence estimated in this way approximates data shifted in phase by the peak phase shift amount from the received data sequence.

Since the Doppler frequency Δf has a plus or minus sign, the peak phase shift amount ΔCP may have any value of plus and minus. In this case, it can be seen from the plus or minus sign of the peak phase shift amount ΔCP that the estimated data sequence can be estimated with times shifted in which of a leading direction and a lagging direction from the sampling times of the received data sequence in order to arrange the peak phases.

Finally, a correlation operation is performed on the estimated data sequence and the replica code and the correlation operation result is integrated. Specifically, the estimated data values of the estimated data sequence are multiplied by the code values of the replica code to calculate the correlation values. By estimating the estimated data sequence from the received data sequence, it is possible to obtain an effect as if the received signal were shifted in phase. Accordingly, in the correlation integrating process of this exemplary embodiment, it is possible to integrate the correlation values in the state where the peak phases are arranged and to achieve improvement of receiving sensitivity in environments such as a weak electric field.

2. EXAMPLE

An example of a receiving device employing the above-mentioned principle will be described below. Here, a mobile phone will be described as an example of an electronic apparatus including a receiving device that receives a GPS satellite signal. Here, an example to which the invention is applicable is not limited to the below-described example.

2-1. Configuration of Mobile Phone

Figure 3:
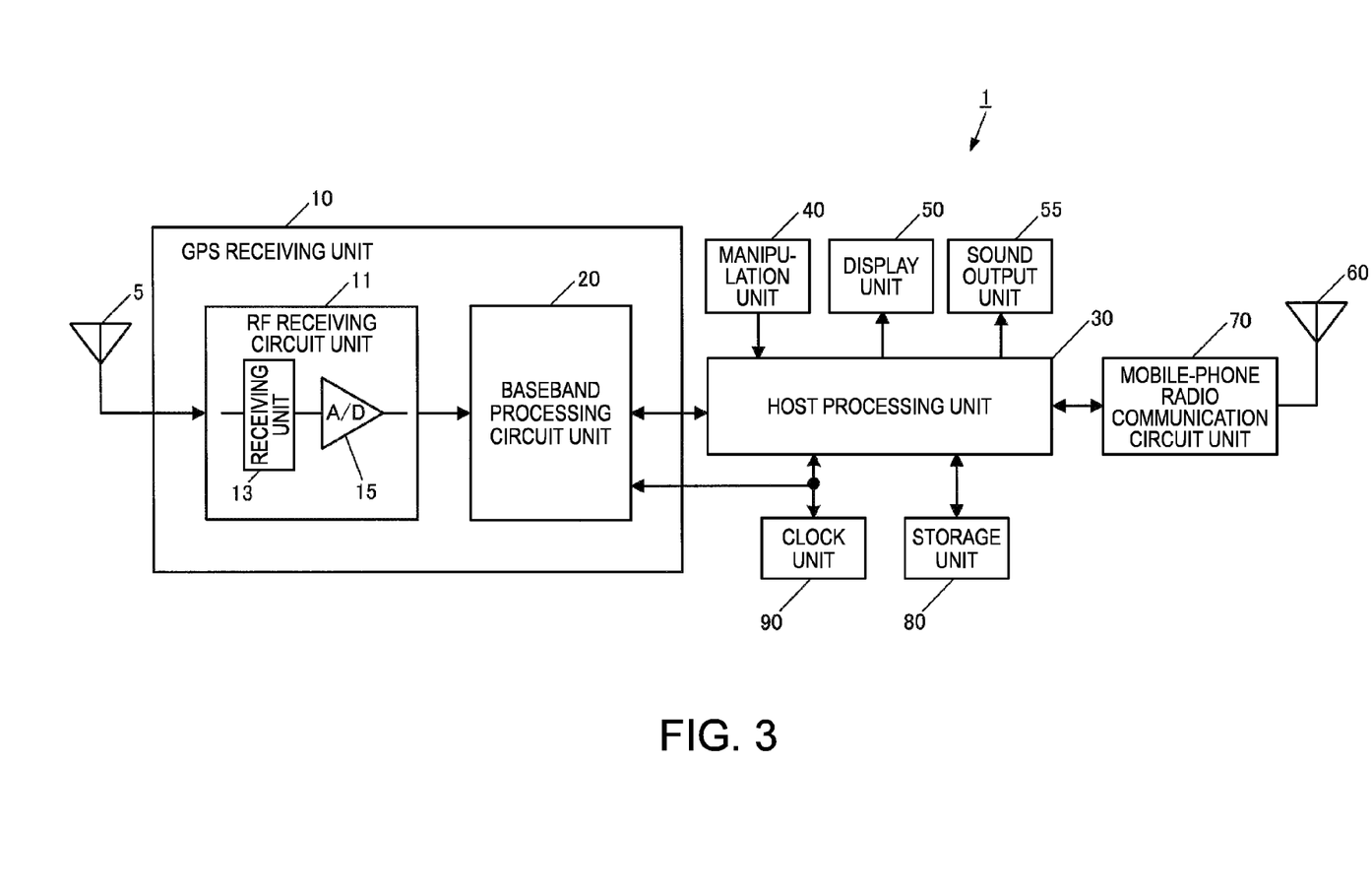
FIG. 3 is a block diagram illustrating an example of a functional configuration of a mobile phone.

FIG. 3 is a block diagram illustrating an example of a functional configuration of a mobile phone 1 according to this exemplary embodiment. The mobile phone 1 includes a GPS antenna 5, a GPS receiving unit 10, a host processing unit 30, a manipulation unit 40, a display unit 50, a sound output unit 55, a mobile-phone antenna 60, a mobile-phone Radio communication circuit unit 70, a storage unit 80, and a clock unit 90.

The GPS antenna 5 is an antenna that receives a radio frequency (RF) signal including a GPS satellite signal emitted from a GPS satellite, and outputs the received signal to the GPS receiving unit 10.

The GPS receiving unit 10 is a circuit or a device that calculates the position of the mobile phone 1 on the basis of the signal output from the GPS antenna 5 and corresponds to a so-called GPS receiver. In this exemplary embodiment, the GPS receiving unit 10 corresponds to the receiving device.

The GPS receiving unit 10 includes an RF receiving circuit unit 11 and a baseband processing circuit unit 20. The RF receiving circuit unit 11 and the baseband processing circuit unit 20 may be manufactured as individual large scale integration (LSI) chips or as a single chip.

The RF receiving circuit unit 11 includes a receiving unit 13 that receives an RF signal output from the GPS antenna 5 and an A/D converter 15 that performs an A/D conversion by sampling the received signal (analog signal) at a given sampling time interval, and outputs the received signal as a received data sequence. The resolution and the sampling rate of the A/D converter 15 can be appropriately selected. In this exemplary embodiment, the sampling rate is selected to correspond to 1/2 chip.

The baseband processing circuit unit 20 performs operations such as removing a carrier or performing a correlation operation on the received signal output from the RF receiving circuit unit 11 to capture a GPS satellite signal. The baseband processing circuit unit calculates the position or the clock error of the mobile phone 1 using time data or satellite orbit data extracted from the captured GPS satellite signal.

The host processing unit 30 is a processor that comprehensively controls the units of the mobile phone 1 in accordance with various programs such as a system program stored in the storage unit 80, and includes a processor such as a central processing unit (CPU). The host processing unit 30 displays a map on which a current position is marked on the display unit 50 or uses the position coordinate thereof for various application processes on the basis of the position coordinate acquired from the baseband processing circuit unit 20.

The manipulation unit 40 is an input device including, for example, a touch panel or button switches, and outputs a signal of a pressed key or button to the host processing unit 30. By manipulation of the manipulation unit 40, various instructions such as a call request, a request for e-mail transmission and reception, requests for executing various applications, and a request for position calculation are input.

The display unit 50 is a display device including a liquid crystal display (LCD) or the like and displays a variety of information based on a display signal output from the host processing unit 30. A position display picture, time information, or the like is displayed on the display unit 50.

The sound output unit 55 is a sound output device including a speaker or the like and outputs various sounds based on a sound output signal output from the host processing unit 30.

A sound in call, audio guidance relevant to various applications, and the like are output from the sound output unit 55.

The mobile-phone antenna 60 is an antenna used to transmit and receive a mobile-phone radio signal to and from a wireless base station installed by the communication service provider of the mobile phone 1.

The mobile-phone radio communication circuit unit 70 is a communication circuit unit of a mobile phone including an RF conversion circuit and a baseband processing circuit and realizes calls or transmission and reception of e-mails by modulating and demodulating the mobile-phone radio signal.

The storage unit 80 includes a storage device such as a ROM (Read Only Memory), a flash ROM, and a RAM (Random Access Memory) and stores a system program allowing the host processing unit 30 to control the mobile phone 1, various programs for performing various application processes, or data.

The clock unit 90 is an internal clock of the mobile phone 1 and includes a crystal oscillator including a quartz vibrator and an oscillation circuit. The clocked time of the clock unit 90 is frequently output to the baseband processing circuit unit 20 and the host processing unit 30. The clocked time of the clock unit 90 is corrected on the basis of the clock error calculated by the baseband processing circuit unit 20.

2-2. Configuration of Baseband Processing Circuit Unit

Figure 4:
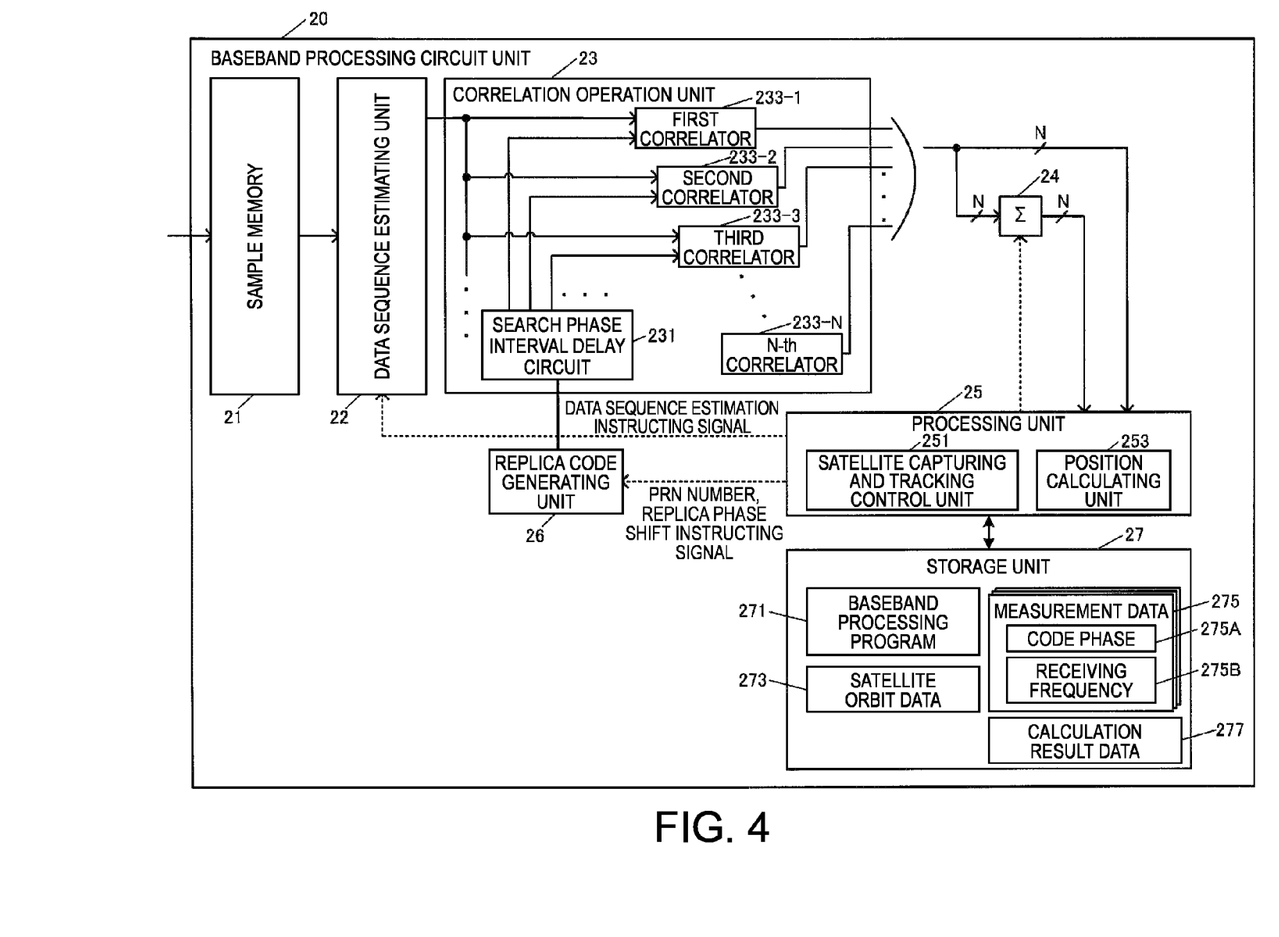
FIG. 4 is a block diagram illustrating an example of a circuit configuration of a baseband processing circuit unit.

FIG. 4 is a diagram illustrating the circuit configuration of the baseband processing circuit unit 20 and is a diagram illustrating circuit blocks of this example. The baseband processing circuit unit 20 includes a sample memory 21, a data sequence estimating unit 22, a correlation operation unit 23, an integration unit 24, a processing unit 25, a replica code generating unit 26, and a storage unit 27 as main functional units.

The sample memory 21 is a storage unit that stores the received data sequence output from the RF receiving circuit unit 11 by a predetermined time. For example, when the sampling time interval of the received data sequence output from the RF receiving circuit unit 11 is 1/2 chip and the received data sequence corresponding to 10 ms is stored in the sample memory 21, a data capacity of sample values corresponding to 1023×20=20460 is necessary.

The data sequence estimating unit 22 performs a predetermined interpolating operation based on the sampled values of the received data sequence stored in the sample memory 21 on the basis of the above-mentioned principle in response to a data sequence estimation instructing signal output from the processing unit 25 to estimate an estimated data sequence. The estimated data sequence is output to the correlation operation unit 23.

The correlation operation unit 23 is a circuit unit that performs a correlation operation on the estimated data sequence output from the data sequence estimating unit 22 and the replica code generated by the replica code generating unit 26 to calculate correlation values of the phases (sampling phases). The correlation operation unit 23 includes a search phase interval delay circuit 231 and N correlators 233 (a first correlator 233-1, a second correlator 233-2, . . . , an N-th correlator 233-N).

The search phase interval delay circuit 231 is a circuit that delays the replica code generated by the replica code generating unit 26 by the search phase interval and that outputs the delayed replica code to the correlators 233. In other words, the replica code is delayed and output so that the replica codes of the neighboring correlators 233 have the search phase interval.

The search phase interval corresponds to the given phase search interval. The search phase interval is fixed and is, for example, 1/2 chip. In this case, the search phase interval delay circuit 231 generates and outputs N signals of which the replica code is shifted by 1/2 chip×i (where i is an integer of 0 to (N−1)). In this exemplary embodiment, the search phase interval delay circuit 231 serves as a phase shift unit that shifts the phase of the replica code by a given search phase interval.

Each correlator 233 calculates a correlation value by multiplying the estimated data value of the estimated data sequence by the code value of the replica code corresponding to the correlator 233 output from the search phase interval delay circuit 231.

N correlation values calculated by the N correlators 233 are output to the integration unit 24 and the processing unit 25 from the correlation operation unit 23.

The integration unit 24 integrates the correlation values output from the N correlators 233 for each correlator 233 in response to an integration instructing signal output from the processing unit 25. At this time, the integration unit 24 integrates the correlation values as the correlation operation result without shifting the phase thereof. That is, the output from the same correlator 233 is integrated without any change. This is because the influence of the Doppler shift is compensated for already through the estimation of the estimated data sequence in the data sequence estimating unit 22. For example, the integration time of allowing the integration unit 24 to integrate the correlation values is set as a time of about several hundred ms to several seconds by the processing unit 25.

The replica code generating unit 26 is a circuit unit that generates a replica code used for the correlation operation unit 23 to perform a correlation operation. The replica code generating unit 26 generates a replica code, which replicates the C/A code relevant to a GPS satellite to which the PRN number has been assigned, in an instructed phase in response to the PRN number (satellite number) and a replica phase shift instructing signal output from the processing unit 25. The replica code generating unit 26 includes an oscillator such as a code numerical controlled oscillator (NCO).

The processing unit 25 is an arithmetic and control unit that collectively controls the functional units of the baseband processing circuit unit 20 and includes a processor such as a CPU or a DSP (Digital Signal Processor). The processing unit 25 includes a satellite capturing and tracking control unit 251 and a position calculating unit 253 as main functional units.

The satellite capturing and tracking control unit 251 controls capturing and tracking of a GPS satellite. Specifically, the satellite capturing and tracking control unit estimates a Doppler frequency of the GPS satellite signal received from each GPS satellite on the basis of the relative positional relationship between the GPS satellite and the mobile phone 1. A shift amount (peak phase shift amount) by which the peak phase is shifted due to the Doppler shift during the integration time interval is calculated using the estimated Doppler frequency. Therefore, the satellite capturing and tracking control unit 251 serves as a shift amount calculating unit that calculates the peak phase shift amount.

When the calculated peak phase shift amount is equal to or more than the search phase interval, the satellite capturing and tracking control unit 251 controls the replica code generating unit 26 to generate the replica code with the shift of the search phase interval, and controls the data sequence estimating unit 22 to estimate the estimated data sequence with the time corresponding to the shift amount more than the search phase interval as the shift time. Therefore, the satellite capturing and tracking control unit 251 also serves as a control unit that controls the data sequence estimating unit 22 and the replica code generating unit 26. When the peak phase shift amount is equal to or more than the search phase interval, under this control, the data sequence estimating unit 22 estimates the estimated data sequence with the time corresponding to the difference between the search phase interval and the peak phase shift amount as the shift time and the correlation operation unit 23 performs a correlation operation on the replica code with the phase shifted by the search phase interval and the estimated data sequence.

The satellite capturing and tracking control unit 251 sets a phase shift amount (hereinafter, referred to as "data sequence-estimating shift amount") corresponding to the shift time, by which the sampling times of the received data sequence are shifted when estimating the estimated data sequence, on the basis of the peak phase shift amount. Then, the satellite capturing and tracking control unit 251 controls the estimated data sequence to follow the designated shift time (shift amount) by generating a data sequence estimation instructing signal including the set data sequence-estimating shift amount and outputting the generated data sequence estimation instructing signal to the data sequence estimating unit 22.

The satellite capturing and tracking control unit 251 sets a phase shift amount (hereinafter, referred to as "replica phase shift amount") of the replica code on the basis of the peak phase shift amount. The satellite capturing and tracking control unit 251 controls the replica code generating unit 26 to generate the replica code of the designated GPS satellite with a shift of the designated phase shift amount by generating a replica phase shift instructing signal including the set replica shift amount and outputting the generated replica phase shift instructing signal to the replica code generating unit 26.

The position calculating unit 253 performs a predetermined position calculating process using the GPS satellite signal captured and tracked under the control of the satellite capturing and tracking control unit 251, and calculates the position (position coordinate) and the clock error (clock bias) of the mobile phone 1. The position calculating process can be realized as a process employing a technique such as a least square method or a Kalman filter.

The storage unit 27 stores a system program of the baseband processing circuit unit 20, various programs for performing various functions such as a satellite capturing and tracking control function and a position calculating function, data, and the like. The storage unit 27 has a work area for temporarily storing data in process, process result, and the like of various processes.

The storage unit 27 stores a baseband processing program 271 which is read and executed as a baseband process (see FIG. 5) by the processing unit 25. The storage unit 27 also stores satellite orbit data 273, measurement data 275, and calculation result data 277.

The satellite orbit data 273 is data such as an almanac or an ephemeris of each GPS satellite. The satellite orbit data 273 is acquired by decoding the GPS satellite signal received from the GPS satellite, and is also acquired as assist data, for example, from a base station of the mobile phone 1 or an assistant server.

The measurement data 275 is data including measurement information which is various quantities relevant to the GPS satellite signal acquired for each captured satellite and includes, for example, a code phase 275A and a receiving frequency 275B.

The calculation result data 277 is data of the calculation result acquired by causing the position calculating unit 253 to perform a position calculating process, and includes the calculated position (positional coordinate) or clock error (clock bias) of the mobile phone 1.

2-3. Flow of Processes

Figure 5:
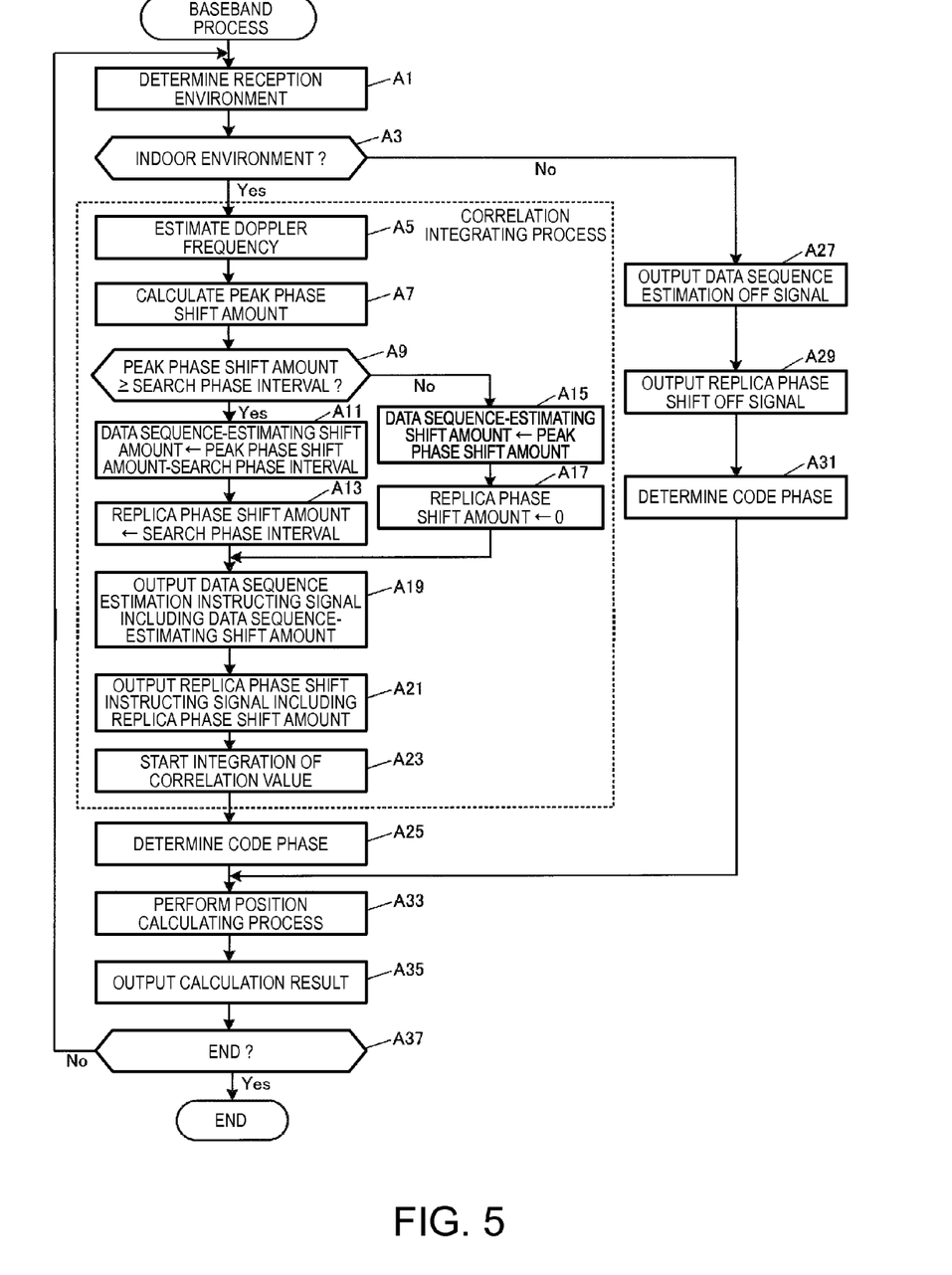
FIG. 5 is a flowchart illustrating a flow of a baseband process.

FIG. 5 is a flowchart illustrating a flow of a baseband process executed by the processing unit 25 in accordance with the baseband processing program 271 stored in the storage unit 27.

First, the processing unit 25 determines a reception environment of a GPS satellite signal (step A1). The reception environment can be comprehensively determined on the basis of information such as an intensity of a received signal (a received signal intensity), an angle of elevation of each GPS satellite, and an arrangement of the GPS satellites in the sky.

Subsequently, the processing unit 25 determines whether the reception environment is an indoor environment (step A3), and performs a correlation integrating process (steps A5 to A23) when it is determined that the reception environment is an indoor environment (YES in step A3).

In the correlation integrating process, the satellite capturing and tracking control unit 251 estimates a Doppler frequency (step A5). Specifically, the satellite capturing and tracking control unit 251 calculates information (satellite information) such as the position, the moving speed, and the moving direction of each satellite to be captured using the satellite orbit data 273. Then, the satellite capturing and tracking control unit 251 estimates the Doppler frequency using the calculated satellite information and the approximate position of the mobile phone 1. The approximate position of the mobile phone 1 may be a position acquired through the previous position calculating process or may be a position of a base station obtained from the base station of the mobile phone 1.

Subsequently, the satellite capturing and tracking control unit 251 calculates the peak phase shift amount on the basis of the Doppler frequency estimated in step A5 (step A7). Specifically, the satellite capturing and tracking control unit 251 calculates the peak phase shift amount $\Delta CP$ using Expression 1 on the basis of the Doppler frequency estimated in step A5.

Thereafter, the satellite capturing and tracking control unit 251 determines whether the peak phase shift amount is equal to or more than the search phase interval (step A9). When this condition is satisfied (YES in step A9), the satellite capturing and tracking control unit 251 sets the value, which is obtained by subtracting the search phase interval from the peak phase shift amount, as the data sequence-estimating shift amount (step A11). The satellite capturing and tracking control unit 251 sets the search phase interval as the replica phase shift amount (step A13).

On the other hand, when it is determined in step A9 that the peak phase shift amount is less than the search phase interval (NO in step A9), the satellite capturing and tracking control unit 251 sets the peak phase shift amount as the data sequence-estimating shift amount (step A15). The satellite capturing and tracking control unit 251 sets zero as the replica phase shift amount (step A17).

Subsequently, the satellite capturing and tracking control unit 251 generates a data sequence estimation instructing signal including the data sequence-estimating shift amount set in step A11 or A15 and outputs the generated data sequence estimation instructing signal to the data sequence estimating unit 22 (step A19). The satellite capturing and tracking control unit 251 generates a replica phase shift instructing signal including the replica phase shift amount set in step A13 or A11 and outputs the generated replica phase shift instructing signal to the replica code generating unit 26 (step A21).

Then, the satellite capturing and tracking control unit 251 starts the integration of correlation values by outputting an integration start instructing signal to the integration unit 24

(step A23). The integration unit 24 integrates the correlation values output from the N correlators 233 at a predetermined integration time interval by individual correlators 233 in response to an instruction signal from the satellite capturing and tracking control unit 251. Accordingly, the correlation integrating process is ended.

Thereafter, the processing unit 25 determines the code phase 275A (step A25). Specifically, the processing unit 25 selects a correlator 233 corresponding to the maximum correlation value out of the correlation values from the N correlators 233 integrated by the integration unit 24. The processing unit 25 determines the code phase 275A on the basis of the sampling phase of the selected correlator 233 and stores the determined code phase as measurement information in the measurement data 275 of the storage unit 27.

On the other hand, when it is determined in step A3 that the reception environment is not an indoor environment (NO in step A3), the satellite capturing and tracking control unit 251 outputs a data sequence estimation OFF signal instructing not to estimate the estimated data sequence to the data sequence estimating unit 22 (step A27). The satellite capturing and tracking control unit 251 outputs a replica phase shift OFF signal instructing not to shift the phase of the replica code to the replica code generating unit 26 (step A29).

Subsequently, the processing unit 25 determines the code phase 275A (step A31). Specifically, the processing unit 25 selects a correlator 233 corresponding to the maximum correlation value out of the correlation values output from the N correlators 233. Then, the processing unit 25 determines the code phase 275A on the basis of the sampling phase of the selected correlator 233 and stores the determined code phase as measurement information in the measurement data 275 of the storage unit 27.

After step A25 or A31, the position calculating unit 253 performs a position calculating process (step A33). Specifically, the position calculating unit 253 calculates a pseudo-distance using the code phase 275A acquired for each captured satellite and performs a known position calculating operation using the pseudo-distance to calculate the position and the clock error of the mobile phone 1. The calculation result is stored as the calculation result data 277 in the storage unit 27. Then, the processing unit 25 outputs the calculation result to the host processing unit 30 (step A35).

Subsequently, the processing unit 25 determines whether the flow of processes should be ended (step A37), and performs again the process of step A1 when it is determined that the flow of process should be continued (NO in step A37). On the other hand, when it is determined that the flow of processes should be ended (YES in step A37), the processing unit 25 ends the flow of the baseband process.

2-4. Operational Advantages

In the GPS receiving unit 10, the RF receiving circuit unit 11 receives a GPS satellite signal from a GPS satellite. In the baseband processing circuit unit 20, the sample memory 21 stores a received data sequence obtained by sampling the received signal received by the RF receiving circuit unit 11 at a given sampling time interval. The data sequence estimating unit 22 estimates an estimated data sequence, which is obtained when the received signal is sampled at times shifted by a given shift time from the sampling times of the received data sequence, on the basis of the received data sequence stored in the sample memory 21. The correlation operation unit 23 performs a correlation operation on the estimated data sequence estimated by the data sequence estimating unit 22 and the replica code and the integration unit 24 integrates the correlation operation result from the correlation operation unit 23 at a given integration time interval.

When the correlation operation is performed on the received signal and the replica code, a phenomenon in which the peak phase is shifted due to the influence of the Doppler shift. However, by estimating the estimated data sequence in consideration of the peak phase shift amount before performing an correlation operation and then performing the correlation operation on the estimated data sequence and the replica code, it is possible to prevent the peak phase from being shifted. As a result, since the correlation values can be integrated in a state where the peak phase is arranged, it is possible to correctly detect the peak phase from the integrated correlation values. By performing a predetermined interpolating operation (for example, a linear interpolating operation) based on the sampled values of the received data sequence, it is possible to simply estimate the estimated data sequence.

3. MODIFICATION EXAMPLE

The invention is not limited to the above-mentioned examples and can be modified in various forms without departing from the concept of the invention. Modification examples of the invention will be described below.

3-1. Change of Sample Number

Although it has been stated in the above-mentioned example that the sampling time interval of the received data sequence is determined depending on the sampling rate of the A/D converter 15, the invention is not limited to this configuration. For example, a second data sequence serving as a second sampling time interval may be generated from the data sequence output from the A/D converter 15 through the use of an interpolating operation (for example, a linear interpolating operation), and the second data sequence may be treated as the received data sequence. By employing this configuration, the A/D converter 15 sets the sampling rate to be high and can change the sampling rate to be equal to the sampling rate (for example, a rate of 1/2 chip) of the replica code at the time of conversion into the received data sequence. The subsequent processes are the same as described in the above-mentioned example.

3-2. Interpolating Operation

Although it has been stated in the above-mentioned example that a linear interpolating operation is exemplified as the interpolating operation used to estimate the estimated data sequence, the interpolating operation is not limited to the linear interpolating operation. An interpolating operation employing known interpolating techniques such as Lagrange interpolation and spline interpolation may be performed to estimate the estimated data sequence.

3-3. Phase Shift of Replica Code

In the above-mentioned example, it has been stated that the replica code generating unit 26 shifts the phase of the replica code under the control of the processing unit 25. That is, the replica code generating unit 26 serves as a phase shift unit. However, by disposing a delay circuit as a phase shift unit between the correlation operation unit 23 and the replica code generating unit 26, the replica code may be shifted in phase in a circuit manner.

3-4. Software Process

Although it has been stated in the above-mentioned example that the correlation operation or the integration of the correlation operation result is realized in a hardware manner by circuits, the operations may be performed in a software manner by the processing unit 25. The processing unit 25 instead of the data sequence estimating unit 22 may estimate the estimated data sequence.

3-5. Electronic Apparatus

Although it has been stated in the above-mentioned exemplary embodiment that the invention is applied to the mobile phone which is a kind of electronic apparatus, the invention is not limited to the mobile phone. For example, the invention may be similarly applied to electronic apparatuses such as a car navigation apparatus, a portable navigation apparatus, a PC, a PDA (Personal Digital Assistant), and a wristwatch.

3-6. Satellite Positioning System

Although the GPS has been exemplified as the satellite positioning system in the above-mentioned exemplary embodiment, other satellite positioning systems such as WAAS (Wide Area Augmentation System), QZSS (Quasi Zenith Satellite System), GLONASS (GLObal NAvigation Satellite System), and GALILEO may be used.

What is claimed is:

1. A receiving device comprising:
    a receiving circuit that receives a satellite signal from a positioning satellite;
    a storage circuit that stores a received data sequence obtained by sampling the signal received by the receiving circuit at a given sampling time interval, the sampling time interval being an amount of time between each successive sample;
    an estimation circuit that estimates an estimated data sequence, which is obtained when the received signal is sampled at a sampling time shifted by a given shift time from the sampling time of the received data sequence, based on the received data sequence, wherein the shift time is less than the sampling time interval;
    a correlation operation circuit that performs a correlation operation on the estimated data sequence and a replica code; and
    an integration circuit that integrates the correlation operation result in the correlation operation circuit at a given integration time interval.

2. The receiving device according to claim 1, wherein the estimation circuit estimates the estimated data sequence by performing a predetermined interpolating operation based on sampled values constituting the received data sequence.

3. The receiving device according to claim 1, wherein the estimation circuit estimates the estimated data sequence using a time corresponding to a shift amount, by which a peak phase is shifted due to a Doppler shift during the integration time interval, as the shift time.

4. The receiving device according to claim 1, further comprising a shift amount calculating circuit that calculates a shift amount, by which a peak phase is shifted due to a Doppler shift during the integration time interval,
    wherein when the shift amount is equal to or more than a given phase search interval, the estimation circuit estimates the estimated data sequence using a time corresponding to a difference between the phase search interval and the shift amount as the shift time and
    the correlation operation circuit performs the correlation operation on the replica code, the phase of which is shifted by the phase search interval, and the estimated data sequence.

5. A correlation integrating method comprising:
    acquiring a received data sequence by sampling a signal received from a positioning satellite at a given sampling time interval, the sampling time interval being an amount of time between each successive sample;
    estimating an estimated data sequence, which is obtained when the received signal is sampled at a sampling time shifted by a given shift time from a sampling time of the received data sequence, based on the received data sequence, wherein the shift time is less than the sampling time interval;
    performing a correlation operation on the estimated data sequence and a replica code; and
    integrating the correlation operation result at a given integration time interval.

* * * * *